(12) United States Patent
Siebers et al.

(10) Patent No.: US 6,251,810 B1
(45) Date of Patent: Jun. 26, 2001

(54) COMPOSITE SOLDER GLASS, FILLING MATERIAL FOR SAME AND METHODS OF USING SAME

(75) Inventors: Friedrich Siebers, Nierstein; Dietrich Mund, Obersüssbach; Hartmut Paschke, Ergolding; Hans-Werner Beudt, Wiesbaden, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/360,302

(22) Filed: Jul. 23, 1999

(30) Foreign Application Priority Data

Jul. 23, 1998 (DE) .............................. 198 33 252

(51) Int. Cl.$^7$ ..................................... C03C 8/12
(52) U.S. Cl. ................. 501/15; 501/18; 501/32; 501/134; 501/136
(58) Field of Search ............... 501/15, 18, 134, 501/136, 32

(56) References Cited

U.S. PATENT DOCUMENTS

| 3,753,911 | * | 8/1973 | Walker, Jr. et al. | 501/136 |
| 4,626,369 | * | 12/1986 | Walker, Jr. | 501/134 |
| 4,710,479 | * | 12/1987 | Yamanaka et al. | 501/15 |
| 4,883,777 | * | 11/1989 | Yamanaka | 501/15 |

FOREIGN PATENT DOCUMENTS

| 25 48 736 | 5/1978 | (DE) . |
| 37 12 569 C2 | 10/1991 | (DE) . |
| 4-160035 | 6/1992 | (JP) . |

OTHER PUBLICATIONS

Engineering Materials Handbook, vol. 4 "Ceramics and Glasses", by ASM International, Copyright ASM International 1991, Selection 14, p. 1069, Sealing Glasses by Carl J. Hudecek No Month.

"Glass Science and Technology", Uhlmann, N.J. Kreidl, Chapter 6, pp. 169–207, Copyright 1984 by Academic Press. Inc No Month.

Gaslote, G. Mueller, in Glashuetten–Handbuch, Z101/1–6, Copyright 1975 durch Huettentechnische Vereinigung der Deutschen Glasindustrie No Month.

* cited by examiner

Primary Examiner—Karl Group
(74) Attorney, Agent, or Firm—Michael J. Striker

(57) ABSTRACT

An improved filling material for a composite solder glass based on doped $PbTiO_3$ is disclosed, in which up to 35 atom % of the Pb atoms and up to 35% Ti atoms are replaced by Mg and/or Ca and a portion of O atoms in the doped $PbTiO_3$ is replaced with halogen atoms, preferably fluorine atoms. This filling material and composite solder glasses containing it are useful for hermetic sealing, soldering and/or coating of individual components made of glass material, glass-ceramic material, ceramic material and metal in the manufacturing of components and devices for electrical engineering and electronics, for hermetic encapsulation of electronic components, vacuum-tight seals or closures of display tubes or for display devices. They are also useful for coating and bonding of special glasses. The filling material can be made by reaction sintering of a powder mixture at temperatures of 800° C. to 1250° C.

13 Claims, No Drawings

COMPOSITE SOLDER GLASS, FILLING MATERIAL FOR SAME AND METHODS OF USING SAME

BACKGROUND OF THE INVENTION

1. Field of the Invention

The present invention relates to a composite solder glass, particularly a composite solder glass with a reduced melting temperature, and a filling material for the solder glass containing doped lead titanate. The composite solder glasses obtained with this filling material are suitable for hermetically sealing, soldering and coating individual components made from glass, glass-ceramic material, ceramic material and metal. Their preferred applications are for devices and components in the electrical engineering and electronics fields. The invention also relates to a method of making these kinds of composite solder glasses and filling materials.

2. Prior Art

Generally a composite solder glass comprises a powder mixture that contains a solder glass powder with a reduced melting temperature and a substantially inert filling material powder for adjustment of the thermal expansion properties. Conventional solder glass powder contains PbO and $B_2O_3$ as the principal ingredients, in particular cases ZnO, F, $SiO_2$, $Al_2O_3$, $Bi_2O_3$ and other conventional glass ingredients are used. Other low melting solder glass powders are based on PbO, $V_2O_5$, $TeO_2$ or other glass systems. PbO—$B_2O_3$-Solder-Glass generally has a thermal expansion coefficient of about 9 to $12 \times 10^{-6}$/K, measured between room temperature and 300° C. The lower melting temperatures are desired in order to keep the thermal stresses for the elements to be bonded or coated small and in order to shorten the processing times for cooling to room temperature from the maximum temperature. During the melting organic auxiliary materials are evaporated, which e.g. are used as suspension agents for application of the composite solder glass. The filling powder comprises one or more filling materials, which should be insert in comparison to the glass powder, so that damaging interactions do not occur, such as dissolution of the filling material by the solder glass, gas release or uncontrolled crystallization of the solder glass. Conventional filling materials for lowing the thermal expansion of composite solder glasses are, e.g., β-eucryptite, cordierite, mullite, willemite, zircon, aluminum oxide and/or lead titanate. The selection of the filling material depends also on the intended use. When good electrical insulation properties are required, alkali-containing filling materials are usually avoided, such as β-eucriptite. Additional description of composition, properties and uses of glass solder is found in "GLASS SCIENCE AND TECHNOLOGY", Uhlmann, N.J. Kriedl; Chapter 6, pp. 169 to 207; Copyright 1984 by Academic Press. Inc.; "Glaslote (Glass solder)", G. Müller, in Glasshütten Handbuch (Glass Smelting Handbook), Z101/1-6, Copyright 1975 by Hüttentechnische Vereinigung of Deutschen Glassindustrie (Smelting Engineering Associated of the German Glass Industry); Engineered Materials Handbook, Volume 4, "Ceramics and Glasses", by ASM INTERNATIONAL, Copyright ASM INTERNATIONAL 1991, Selection 14, p. 1069, "Sealing Glasses" (by Carl J. Hudecek).

In certain cases also additive ingredients, such as $ZrO_2$, $ZrSiO_4$ or $TiO_2$, are added to the composite-solder glass power, which lead to the desired crystallization of the solder glass powder after melting. These crystallizing composite solder glasses, above all, are of advantage in later applications in which a higher thermal load resistance is desired.

The most important requirements of a composite solder glass are a lowered or reduced melting temperature and the adjustment of the thermal expansion property to the element or material to be coated or bonded over the entire temperature range below the freezing point of the composite solder glass to room temperature or the application temperature. The freezing temperature designates the temperature under which relaxation of thermal stresses caused by differing thermal expansion can no longer occur. The thermal expansion property of the composite solder glass is adjusted to fit the material or piece to be coated or bonded. Strength critical parts of the bonding can be assisted when there are insignificant differences in the thermal expansion coefficients during cooling under compressive stress. This compressive stress can compensate an exteriorly acting tensile stress and thus increase the strength. The freezing temperature is 10 to 30° C. above the transformation temperature of the solder glass at the conventional cooling speeds. Additional important requirements for the composite solder glass are good adherence to the material to be coated or bonded, hermetic sealing ability and high strength for the composite.

The matching of the thermal expansion properties over the entire temperature range under the freezing temperature is important in order to avoid temporary tensile stresses. The resulting stresses impair the strength if a mismatch occurs. Cracks or tears which endanger the hermetic seal or the mechanical bond arise immediately or during use if an even larger mismatch occurs.

Known filling materials based on lead titanate and on doped $PbTiO_2$-mixed crystals, in which a part of the Pb or Ti is replaced by other cations, can be characterized as follows in regard to their thermal expansion properties. Until at a certain temperature, the Curie temperature $T_c$, they have a lower often even negative thermal expansion. Above this temperature, at which also the ferroelectric properties also vanish, they have a positive thermal expansion. In order not to impart this discontinuity in the thermal expansion property of the filling material to the composite solder glass, the freezing temperature of the composite solder glass should not substantially exceed the Curie temperature of the filling material. Otherwise larger temporary stresses between the composite solder glass and the pieces or materials to be coated or bonded can hardly be avoided. The Curie temperature amounts to about 490° C. in pure $PbTiO_3$. The Curie temperature is strongly reduced by a series of cation substitutions, such as the substitution of Pb by Ca. This can make this type of cation substitution unusable for composite solder glasses with higher freezing temperatures.

An additional disadvantage of the filling material based on $PbTiO_3$ caused by cationic substitution is that the degree of substitution must be changed within wide limits in order to vary the thermal expansion properties of the filling material. Greater variation of the thermal expansion of the filling material is often only possible, when the type of cation substitution, i.e. the element connected with it is changed. Thus it is important that the composition of the filling material must always be compatible with the glass solder contained in the composite solder glass. An additional risk of impermissible reactions arises then from the new elements introduced by the cationic substitution. Also certain elements are often not allowed because of the requirements of the applications or the processing. Thus e.g. usually alkali atoms must be avoided for applications involving contact with Si as a semiconductor or which require high electrical insulation properties. Furthermore it is economically disadvantageous to prepare a filling material for a wide range of thermal expansions and applications which has many different cations. Because of logistic reasons such as storage, supply and mutual contamination danger it is disadvantageous that the manufacturing conditions must be adjusted to the respective cationic substitution.

The reduced thermal expansion of $PbTiO_3$ and $PbTiO_3$-mixed crystals is defined by the thermal expansion coefficient of the individual crystal axes. The thermal expansion properties often show a distinctive anisotropy. For example, in the case of tetragonal $PbTiO_3$ the a-axis has a weakly positive thermal expansion and the c-axis has a strongly negative thermal expansion. Because of the thermal expansion differences the stresses between the filling material part and the solder glass can lead to damaging microscopic flaws, which can impair the hermetic seal properties and the strength.

German Patent Document DE-A 25 48 736 describes the glass passivation of the silicon semiconductor component. The passivation glass used therein has a reduced melting temperature. If necessary fine grained, undoped lead titanate is mixed in it as a filling material. A matching of the filling material to the thermal expansion properties by substitution of individual cations or anions is not described in this reference.

In Japanese Patent Application JP-A 04-160 035 many cationic substitutions for Pb and especially Ti atoms are described. This plurality of substitutions shows that the crystals of $PbTiO_3$ have a distinctive ability to form mixed crystals at the cationic sites. Thus Pb is replaced up to 5 to 40 atom % by one or more of the elements Ca, Ba and Sr. The Ti atom is replaced up to 5 to 90 at % by Zr, Mg, Co, Zn, Ni, Mn, Sn, Cu, Fe, Al, Bi, Nb, Ta, Sb, Te, V, Mo and W. The glass containing the composite solder comprises PbO, $V_2O_5$, $TeO_2$ and according to choice or optionally $Al_2O_3$, ZnO and $Nb_2O_5$. The substitution by the named cations permits adjustment or matching of the thermal expansion properties of the obtained filling material and its Curie temperature. The use and the manufacture of individual filling materials with clearly different chemical composition is however expensive and involves the above-described technical and economical disadvantages.

German Patent Document DE-A 37 12 569 describes a cation-substituted filling material of the formula:

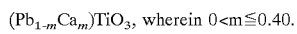

$(Pb_{1-m}Ca_m)TiO_3$, wherein $0 < m \leq 0.40$.

That means that up to 40 atom % of Pb are replaced by Ca. The filling materials are used for sealing elements in electronics components. The substitution of Pb by Ca leads to a strong reduction of the Curie temperature, combined with a reduced value for the thermal expansion of the filling material. The presence of microscopic flaws after sealing in glass is disadvantageous.

German Patent Document DE-A 39 11 176 describes an attempt to eliminate the disadvantages of microscopic flaws in the filling material by using a filling material composition comprising 65 to 75% by weight PbO, 10 to 25% by weight $TiO_2$, 1 to 10% by weight $Fe_2O_3$, 1 to 12% by weight $WO_3$ and 0 to 5% CaO. In this composition the Pb is preferably replaced by a Ca atom and the Ti preferably by a combination of Fe and W. Composite glass solder made with the filling material of the claimed composition has a thermal expansion coefficient between 3.5 and $5.0 \times 10^{-6}/°C$. between room temperature and 250° C., also in a comparatively limited range. The filling materials are especially suitable for is obtaining a reduced thermal expansion coefficient in composite solder glass. The Curie temperature is strongly reduced with the claimed cation substitution to a value of about 300° C., which makes the named filling materials unusable for many composite solder glasses with higher freezing temperature.

SUMMARY OF THE INVENTION

It is an object of the present invention to provide filling materials for use in a composite solder glass, advantageously with a reduced melting temperature, which suffices for most engineering and economic requirements. It should be possible to adjust the thermal expansion properties of the filling material by small changes in the filling material chemical composition. However these changes should not substantially reduce the Curie temperature in order to guarantee that the filling material can be used in composite solder glass with different freezing temperatures. Furthermore the current manufacturing conditions should be substantially maintained the same. Furthermore the composite solder glasses formed should have good adherence to materials or objects to be coated or bonded and should have no damaging microscopic flaws.

It is also an object of the invention to provide a process for making this sort of filling material and a composite glass which contains this filling material. It also concerns their use for making electronic and electrical devices.

These objects are attained by a filling material of the above-described kind which includes a doped $PbTiO_3$ in which Pb atoms have been replaced up to 35 at % and Ti atoms have been replaced up to 35 at % by other cations and a portion of the oxygen atoms present have been replaced by halogen atoms.

A filling material can be obtained in which the desired properties are surprisingly retained when O atoms are replaced as well as Pb and Ti atoms.

According to the invention the oxygen atoms are replaced by halogen atoms, especially fluorine, chlorine, bromine, iodine and pseudo-halogens and/or sulfur. Fluorine atoms are particularly preferred.

Thus according to the invention based on a doped $PbTiO_3$ mixed crystal up to 40 at %, advantageously up to 35 at % and preferably up to 30 at % of the Pb atoms are replaced with other cations and up to 40 at %, advantageously up to 35 at % and preferably up to 30% Ti atoms are replaced by other cations. In individual cases with a higher substitution of Pb and Ti than 35 at % the filling material is no longer compatible with glass solder without more. This concerns, above all, the dissolving of the filling material particles, the increase of the melting temperature and the need for uncontrolled crystallization. As a lower limit for Ti and Pb substitution 0.1 at % has proven advantageous, but at least 1 at % is preferred.

Small changes in the range of anionic substitution allow adjustment of the thermal expansion properties of the filling material as desired. The Curie temperature is thus not substantially lowered, but is even usually increased, which allows the use of the filling material in composite solder glass with different freezing temperatures. The insignificant change in the chemical composition for the anions allows the use of the same manufacturing conditions. The adherence of the composite solder glasses on elements to be coated or bonded is good and is even partially improved by the halogen replacement. Microscopic flaws can be avoided by the compositions according to the invention.

The adjustment of the thermal expansion properties of the filling material and thus also that of the composite solder glass occurs via the level of added halogen utilized in the manufacture of the filling material. The thermal expansion of the filling material increases continuously and adjustably with increased replacement in the preferred embodiment in which fluorine additives are used. If one increases the replacement of the oxygen atom by fluorine a few atom %, the thermal expansion of the filling material is already clearly increased. Thus it is possible to adjust the thermal expansion of the filling material as desired without drastically changing the composition of the filling material or adding new substances/additive ingredients. If the compatibility with glass contained in the composite solder glass is maintained, an additional risk of impermissible reactions of the filling material with the solder glass is not present. Also logistic advantages results since no additional raw material is required and the manufacturing conditions may be kept the same.

Besides the increase of the thermal expansion of the filling material that occurs with increasing replacement of the oxygen atom by halogen atom also the Curie temperature stays the same or even increases. This is advantageous because the filling material composition can also be used in composite solder glass with higher freezing temperature.

Up to 18 at %, advantageously up to 15 at %, and preferably up to 13 at % of the stoichiometrically required oxygen atoms are replaced by the above-described halogen atoms in the starting mixture for making the filling material powder. Higher contents of fluorine or other halogen atoms or pseudo-halides lead to undesirable secondary phases in the filling material, since the ability of the $PbTiO_3$ mixed crystal to receive these atoms is limited. It has been shown that stable fluoride or halide occurs as a secondary phase, which of course contributes to the increase of the thermal expansion, however increases the risk of undesired reaction with the solder glass. Of course the desired goals of the invention are achievable with reduced halogen substitution, however the minimum amount of 0.1 at %, especially advantageously 0.5 at % is preferred. At least 3 at % halogen substitution of O is particularly preferred.

Filling material in which a portion of the Pb atoms is replaced by an amount of Mg and/or Ca atoms and in which anion substitution takes place has especially good thermal expansion properties.

The thermal expansion of the filling material is reduced by Ca substitution. The thermal expansion coefficient is comparatively constant up to the Curie temperature. The strong decrease of the Curie temperature is disadvantageous.

The Curie temperature is less strongly reduced by replacement of Pb atoms with Mg atoms. The thermal expansion coefficient at room temperature has slightly negative to positive values and is reduced with increasing temperatures until it reaches strong negative values at the Curie temperature.

It is possible to adjust the thermal expansion dependence by combined Mg and Ca replacement in the filling material. Thus the contrary expansion behavior of many $PbO—B_2O_3$ solder glasses can be compensated. In these solder glasses the thermal expansion coefficient at room temperature increases from room temperature up to its transformation temperature and further up to the freezing temperature. Thus composite solder glass made from $PbO—B_2O_3$-solder glass and Mg/Ca substituted filling material may be made, which provides a temperature independent thermal expansion coefficient and which is well matched to elements to be coated or bonded. Thus the occurrence of temporary thermal expansion is prevented.

It has been shown that the known good replaceability of the Ti atoms can be used in the filling materials according to the invention. By substitution with a combination of Fe and W or Ni and W the thermal expansion coefficient of the filling material decreases. The reduced values for the Curie temperature are disadvantageous. The substitution of the Ti by Zr permits an increase in the thermal expansion coefficient.

It is possible to keep the average linear thermal expansion coefficient of the filling material between 20 and 300° C. from strong negative values up to less than $2 \times 10^{-6}/K$ according to choice by replacement of oxygen atoms by halogen atoms in the filling material composition according to the invention. Higher thermal expansion coefficients are not significant, since above $2 \times 10^{-6}/K$ already proven and economical filling materials, such as cordierite, willemite, mullite, aluminum oxide and zircon, are available. Filling materials with average linear thermal expansion coefficients of about $-2 \times 10^{-6}/K$ can be made with β-eucryptite or high quality quartz mixed crystals, but these filling materials have the disadvantage that the $Li_2O$ that they contain acts unfavorably in applications in which a high electrical insulation ability is required. By substitution of oxygen according to the invention with halogen atom, especially with fluorine atom, a technically important range of the thermal expansion of filling material is covered in an economically beneficial manner.

The filling materials are made from an initial mixture which contains the ingredients required for the filling material composition. The ingredients of the starting mixture are present as oxides, carbonates, nitrates, and so forth. The halogen atoms are introduced as stable compounds, such as fluorides, chlorides, etc. These ingredients are present as a reactive powder and are mixed in the starting mixture until it is homogeneous. To make the filling material by internal reactions the powdery starting mixture is heated an reacted until at the desired filling material composition. The reaction is chiefly performed in closed or covered pots or containers, in order to prevent evaporation and contamination of the oven by lead. The lead is introduced preferably as red lead (lead (II) orthoplumbate (IV)), because this leads to a higher oxidation state in the reaction mixture compared with black lead oxide, Pb(II) O, whereby the formation of undesired reduced Pb can be prevented. Also use of the rare $PbO_2$ or the sintering in oxygen atmosphere can reduce the evaporation or reduction of Pb. The reaction is preferably performed at temperatures in the range of from 800 to 1250° C., because the required processing times are in the economically significant range of a few hours. The named temperatures are achievable in a conventional commercial oven and the damaging evaporation of the ingredients is still controllable at these temperatures.

The ingredients of the starting mixture are present with an average grain size in a range of a few μm, e.g. from 2 to 12 μm, in order to provide good reactivity. By compression of the reaction mixture, e.g. by making it into pellets or by pressing it prior to reaction sintering, one can accelerate the reaction and reduce the evaporation loss.

One cannot entirely prevent evaporation of individual ingredients during manufacture, when one adds volatile elements or compounds into the starting mixture in excess. It is possible to compensate for evaporation of these components. In case of lead it is has proven to be completely sufficient to additionally add 0.5 to 3 percent by weight of lead oxide compounds or $PbF_2$ to the reaction mixture.

After reaction sintering and cooling the obtained filling material composition is ground to the desired grain size and is available for use. In cases in which an especially good uniformity of the filling powder is required, an additional heating and grinding can occur after the first reaction sintering. Small differences in filling material composition, e.g. different evaporation rates of materials from the edge or from the center of the reaction mixture, can be compensated by subsequent heat treatments, which are performed in a temperature range of from 800 to 1250° C.

A satisfactorily reproducible filling material composition with sufficiently reproducible properties is obtained after two or more reaction sintering steps. In many cases however the greater effort required by intermediate grinding steps is not needed. Also in the second heat treatment the starting powder is advantageously compacted or pressed in order to accelerate the reaction processes and reduce evaporation. In order to prevent possible evaporation of volatile lead compounds, those compounds can be added in excess in this second heat treatment.

A second manufacturing method for the filling material composition according to the invention comprises smelting. The initial mixture is heated to a higher temperature than in reaction sintering at about 1550° C. and thus is smelted. Also in this method the evaporation of volatile components, such as PbO or $PbF_2$, is to be reduced by covering the smelting vessels, by forming a cooler rich layer or other features. If necessary the evaporating components are added in excess. The uniform starting melt is poured out and crystallizes on cooling. The casting can occur in water or on metal plates. The great reactivity of the melt in comparison to most vessel materials is disadvantageous in manufacturing by means of smelting. The crystalline filling material composition is, if necessary, ground after an additional temperature treatment to the desired grain size. To improve the uniformity, as in reaction sintering, a second temperature treatment and subsequent new grinding can be performed.

The making of the filling material according to the invention can also occur by precipitation of the starting ingredients from an aqueous solution. Suitable starting materials, e.g. include nitrates and fluorides. The dissolved starting compounds are precipitated by changing the pH value, by chemical addition and/or by temperature increase. The powder so obtained is purified by filtration, dried and a thermal after-treatment is performed. After that the powder is ground to the desired grain size.

During manufacture of the composite solder glass the fill material powder is mixed with a solder glass powder. In order to prevent damaging microscopic flaws arising in the composite solder glass after melting, the filling material powder has an average grain size, which is preferably less than 15 μm, especially preferably less than 8 μm. The higher grain sizes are unfavorable, because the distinctive stresses between the filling material particles and the solder glass can lead to damaging microscopic flaws or discontinuities, which impair the hermetic seal and strength.

In order to adjust the thermal expansion of the composite solder glass, filling material in amounts to up to 60 vol %, especially up to 55 vol %, relative to the total amount of the composite solder glass, have proved to be advantageous. Preferably an amount of filling material up to 50% is used. Higher filling material amounts impair the flow properties of the solder glass and raise the melting temperature.

The filling material compositions according to the invention are processed with known lower melting solder glasses. Well tested solder glasses with $PbO_2$ and $B_2O_3$ as the principal materials are compatible with filling materials. These lower melting solder glasses contain, in various embodiments, additional ZnO, $SiO_2$, $Al_2O_3$, $Bi_2O_3$, F and additional conventional glass ingredients such as alkali.

Besides the lower melting solder glass and the filling material compositions according to the invention the composite solder glass can contain additional ingredients. The known filling material, such as cordierite, β-eucryptite, mullite, willemite, aluminum oxide or zircon can be added individually or in combination, in order to obtain certain thermal expansion behavior and/or other properties, such as strength, thermal conductivity, electrical insulation properties and/or dielectric properties.

Crystallization-inducing additives, such as $ZrO_2$, $ZrSiO_4$, $TiO_2$, crystalline lead borate compounds, crystalline zinc compounds and/or already crystallized glass powder, are added in order to bring the solder glass to the desired crystallization after melting. It is important that the melting does not impair the crystallization, but it takes place after a certain delay after a smooth flowing melt is formed. Crystallizing composite solder glasses are of advantage above all when a high thermal load is desired in subsequent use. The desired crystallization after melting of the solder glass is attained by selection of the type and amount of the crystallization-inducing additive ingredient.

It is also possible to perform subsequent replacement of the oxygen atom by a halogen atom by means of treatment with acids, such as HF or HCl. Also heating in a halogen-containing atmosphere can cause this type of exchange.

The filling material or composite solder glasses obtained in this manner are used especially for making devices and components in electrical engineering and electronics. As examples hermetic containers for electronic component, vacuum-tight seals of display tubes or of displays or signaling devices and the coating or bonding of special glasses can be mentioned.

The present invention is illustrated in greater detail with the aid of the following examples.

EXAMPLES

Table I contains three examples for compositions of low melting solder glasses in % by weight and the associated measured parameters, such as the thermal expansion between 20° C. and 200° C. or 20° C. and 250° C., and 20° C. and 300° C., the transformation temperature (Tg in ° C.), the density and the softening temperature (Ew in ° C.). The solder glasses are melted in a known manner and the melt is quenched in water or between water-cooled metal rolls to a granulate. The granulate is ground to an average grain size of about 5 to 10 μm.

TABLE I

| SOLDER GLASS COMPOSITIONS AND PROPERTIES | | | |
|---|---|---|---|
| EXAMPLE -Nr. | A % by weight | B % by weight | C % by weight |
| PbO | 74.0 | 76.0 | 85.0 |
| $B_2O_3$ | 10.5 | 16.0 | 14.0 |
| ZnO | 1.0 | 2.0 | |
| $PbF_2$ | 13.0 | — | |
| $Al_2O_3$ | 1.0 | 2.0 | 1.0 |
| $SiO_2$ | — | 4.0 | |
| $Li_2O$ | 0.5 | — | |
| Physical Properties | | | |
| Tg(° C.) | 268 | 366 | 306 |
| Ew(° C.) | *1 | 423 | 355 |
| density(g/cm³) | 6.780 | 5.784 | 6.525 |
| Thermal | expansion | coefficients | $(10^{-6})$ |
| $\alpha_{20/200}$ | 13.5 | 9.0 | 11.1 |
| $\alpha_{20/250}$ | *1 | 9.2 | 11.3 |
| $\alpha_{20/300}$ | *1 | 9.5 | *1 |

*1 not measured

Table II contains twelve examples of filling material compositions. In the manufacture of the filling material PbO is introduced by means of red lead (lead (II) orthoplumbate (IV)) and CaO is introduced by means of calcium carbonate. Then MgO is include by means of $MgCO_3 \cdot H_2O$. Otherwise the oxides or halide compounds are used. Table II shows the ingredients used in the filling material composition in % by weight. The manufacturing conditions and properties of the filling materials are similar included. In examples 5 and 10 lead oxide compounds are also added in order to compensate for the volatility of these ingredients. The starting mixture is ground up to form a ground mixture with an average grain size of 5 to 10 μm. The filling material is made in the given heat treatment. The reaction mixture is then ground up to an average grain size of from 5 to 8 μm prior to the second heating. After the reaction sintering the obtained filling material has a grain size of from 5 to 8 μm. The resulting filling material samples are characterized in the Tables by their thermal expansion coefficients between 20° C. and 200° C. or 20° C. and 250° C., 20° C. and 300° C., 20° C. and Tc and by their Curie temperature (Tc in ° C.). The determination of the thermal expansion coefficient and the Curie temperature occurs from the thermal expansion over temperature. For determination of the thermal expansion coefficient a bar is pressed from the powder prior to the final temperature treatment and this sample is subjected to heating, i.e. a thermal treatment. The above-named measured properties of the bar are determined with a dilatometer. The determination of the Curie temperature of the ferroelectric ceramic material is, for example, described in "Piezoelectric Ceramics"; B. Jaffe, W. R. Cook, H. Jaffe, Academic Press, London & New York, 1971 and "Einführung in die Ferroelektrizität (Introduction to Ferroelectricity)"; A. S. Sonin, B. A. Strukov, Akademie Verlag (Academic Press), Berlin, 1974.

In order to make the composite solder glasses solder glass and filling material are mixed according to the examples in Table III in the stated volume proportions. Additional filling material and crystallization required additives are added. The powder mixture obtained is ground to obtain improved uniformity and to reduce the grain size in a mill, especially a ball mill, to an average grain size of about 3 to 6 μm. In order to characterize the glass and flow properties, the powder was distributed on a substrate glass to a height of about 3 mm in an extended shape and heated in a range between 300° C. and 600° C. in a gradient oven together with the substrate glass for 30 minutes. For example, the commercial glass AF 45 of DESAG (thermal expansion coefficient $\alpha_{20/300}$=4.5×10$^{-6}$/K) was used as substrate glass for a composite solder having a correspondingly low thermal expansion coefficient. The determination of the average linear thermal expansion coefficients (alpha) was always performed according to DIN 52 328 and the determination of the transformation temperature (Tg) was always performed according to DIN 52 324. By observation of the sample from below through the substrate glass the glass temperature at which a resulting bond between the composite solder glass and the substrate glass arises is satisfactorily established. The smooth flow temperature characterizes the temperature at which the composite solder glass flows completely smoothly.

The composite solder glass powders are pressed into a rod and the sample so obtained is sintered at the given smooth flow temperature. The thermal expansion coefficient of the composite solder glass rod so obtained is measured at temperatures between 20° C. and 200° C. or 20° C. and 300° C.

In example 11, 4% by weight $ZrSiO_4$ are required as crystallization-required additives. The composite solder glass so obtained flows smoothly as desired and subsequently crystallizes.

Examples 1, 2 and 3 show that the thermal expansion coefficient of the filling material and the composite solder glass can be adjusted within wide limits by variation of the fluorine additive ingredient during the making of the filling material. By variation of the properties of the solder glass and filling material in the composite solder glass the thermal expansion coefficient can be changed and are adjusted (Examples 3 and 4). The composite solder glass powders of examples 1 and 4 were processed to form a screen printing solder paste by addition of screen printing oil in a turpentine base. Different glass substrates were printed in a one-stage and two-stage screen printing method with the paste so obtained. The powder from example 1 was printed all over on BOROFLOAT 40. BOROFLOAT 40 is a borosilicate glass with a thermal expansion coefficient of 4.0×10$^{-6}$/K between a temperature of 20° C. and 300° C. The composite solder glass powder from example 4 was printed in the same way all over on a substrate glass D 263. D 263 is a glass of the DESAG with a thermal expansion coefficient of 7.3× 10$^{-6}$/K between a temperature of 20° C. and 300° C. The screen printing pattern with a printed surface area of 30×55 mm$^2$ is burned on in a chamber over at 510° C. for 30 min. The layer thickness after burning in amounts to about 100 μm to 175 μm. The layers have good adherence and are free of damaging microscopic flaws according to both visual observation and observation under a microscope.

The measured values show how an adjustment to the different glass substrates can be attained by controlling the level of the fluorine additives in the manufacture of the filling material. The conditions in the manufacture of the filling material, the composite solder glasses and the coatings can otherwise be kept the same.

TABLE II

FILLING MATERIAL COMPOSITIONS, MANUFACTURE AND PROPERTIES (all % are percentages by weight): Part I, Filling Material Compositions

| Filling Material | 1, % | 2, % | 3, % | 4, % | 5, % | 6, % | 7, % |
|---|---|---|---|---|---|---|---|
| $Na_2O$ | | | | | | | |
| NaCl | | | | | | | |
| $K_2O$ | | | | | | | |
| MgO | 0.77 | 0.77 | | 0.15 | 0.15 | 1.12 | 1.12 |
| $MgF_2$ | | | 1.17 | | | 2.89 | 2.89 |
| CaO | 3.22 | 1.60 | | 3.01 | 3.01 | | |
| $CaF_2$ | 1.49 | 3.71 | 5.87 | 1.45 | 1.45 | | |
| $BaF_2$ | | | | | | | |
| PbO | 63.98 | 63.58 | 62.94 | 65.77 | 65.77 | 66.32 | 66.32 |
| $La_2O_3$ | | | | | | | |
| $LaF_3$ | | | | | | | |
| $TiO_2$ | 30.54 | 30.35 | 30.02 | 29.62 | 29.62 | 29.67 | 29.67 |
| $ZrO_2$ | | | | | | | |
| additive | | | | | 2.0, $Pb_2O$ | | |

| Filling Material | 8, % | 9, % | 10, % | 11, % | 12, % |
|---|---|---|---|---|---|
| $Na_2O$ | | | | | 0.44 |
| NaCl | | | | | 1.25 |
| $K_2O$ | | | | 1.38 | |
| MgO | | | | | |
| $MgF_2$ | | | | | |
| CaO | | 3.53 | 3.11 | 1.23 | |
| $CaF_2$ | | 0.87 | 1.44 | 1.14 | |
| $BaF_2$ | 5.79 | | | | |
| PbO | 66.38 | 66.05 | 65.94 | 67.00 | 63.63 |
| $La_2O_3$ | | | | | 3.83 |
| $LaF_3$ | | | | | 2.38 |
| $TiO_2$ | 23.76 | 29.56 | 29.51 | 29.25 | 28.47 |
| $ZrO_2$ | | | | | |
| additive | | | | 2.0, $Pb_3O_4$ | |

TABLE II-continued

FILLING MATERIAL COMPOSITIONS, MANUFACTURE AND PROPERTIES (all % are percentages by weight): Part II, Process Heating Conditions, Thermal Expansion Coefficients ($10^{-6}$/K) and Curie Temperatures, Tc (° C.)

| Filling Material | 1 | 2 | 3 | 4 | 5 | 6 | 7 |
|---|---|---|---|---|---|---|---|
| 1st heating | 1000° C., 5 hr | 1000° C., 5 hr | 1000° C., 5 hr | 1000° C., 5 hr | 1000° C., 5 hr | 1000° C., 5 hr | 1000° C., 5 hr |
| 2nd heating | 1000° C., 5 hr | 1000° C., 5 hr | 1000° C., 5 hr | 1000° C., 5 hr | 1000° C., 5 hr | 1000° C., 5 hr | — |
| $\alpha_{20/200}$ | −4.7 | −2.6 | 0.3 | −6.45 | −7.2 | 1.3 | 1.8 |
| $\alpha_{20/250}$ | −5.0 | −2.8 | 0.3 | −6.9 | −7.9 | 1.2 | 1.7 |
| $\alpha_{20/300}$ | −5.4 | −3.0 | −0.2 | −7.0 | −8.1 | 1.0 | 1.7 |
| $\alpha_{20/Tc}$ | −5.4 | −3.7 | −2.0 | −8.8 | −10.6 | −2.4 | −3.2 |
| Tc | 358 | 395 | 421 | 376 | 367 | 461 | 469 |

| Filling Material | 8 | 9 | 10 | 11 | 12 |
|---|---|---|---|---|---|
| 1st heating | 1000° C., 5 hr | 1000° C., 5 hr | 1000° C., 5 hr | 850° C., 4 hr | 900° C., 5 hr |
| 2nd heating | 1000° C., 5 hr | 1000° C., 5 hr | 1000° C., 5 hr | 990° C., 4 hr | 1000° C., 5 hr |
| $\alpha_{20/200}$ | 1.5 | −7.1 | −6.2 | −4.9 | 3.2 |
| $\alpha_{20/250}$ | 1.3 | −7.6 | −6.6 | −4.8 | 3.6 |
| $\alpha_{20/300}$ | 1.0 | −8.7 | −7.3 | −4.5 | 3.9 |
| $\alpha_{20/Tc}$ | −2.3 | −10.3 | −10.0 | −5.3 | 4.3 |
| Tc | 457 | 360 | 368 | 449 | 439 |

The term "at %" or "atom %" used herein means percentages on the basis of number of atoms or moles of the element referred to.

The disclosure in German Patent Application 198 33 252.1 of Jul. 23, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a composite solder glass, particularly a composite solder glass with a reduced melting temperature, filling material for same and methods of using same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. In a filling material for a composite solder glass consisting essentially of $PbTiO_3$, the improvement comprising replacing from 1 to 35 atom % of Pb atoms in said $PbTiO_3$ and from 1 to 35 atom % of Ti atoms in said $PbTiO_3$ each with at least one member selected from the group consisting of Ca atoms and Mg atoms and replacing from 0.1 to 15 atom % of O atoms by F atoms.

TABLE III

COMPOSITE SOLDER GLASSES, THEIR MANUFACTURE AND PROPERTIES (all % are percentages by volume): Part I, Compositions

| Example | 1, % | 2, % | 3, % | 4, % | 5, % | 6, % | 7, % | 8, % | 9, % | 10, % | 11, % | 12, % | 13, % |
|---|---|---|---|---|---|---|---|---|---|---|---|---|---|
| Solder Glass A | | | | | | | 60 | 60 | | | | | 58 |
| Solder Glass B | 55 | 55 | 55 | 65 | | | | | 55 | 55 | | | |
| Solder Glass C | | | | | 55 | 50 | | | | | 54 | 58 | |
| Filler #1 | 45 | | | | | | | | | | | | |
| Filler #2 | | 45 | | | | | | | | | | | |
| Filler #3 | | | 45 | 35 | | | | | | | | | |
| Filler #4 | | | | | 35 | | | | | | | | |
| Filler #5 | | | | | | 50 | | | | | | | |
| Filler #6 | | | | | | | 40 | | | | | | |
| Filler #7 | | | | | | | | 40 | | | | | |
| Filler #8 | | | | | | | | | 45 | | | | |
| Filler #9 | | | | | | | | | | 30 | | | |
| Filler #10 | | | | | | | | | | | 42 | | |
| Filler #11 | | | | | | | | | | | | 42 | |
| Filler #12 | | | | | | | | | | | | | 42 |
| β-eucryptite | | | | | 10 | | | | | | | | |
| cordierite | | | | | | | | | | 10 | | | |
| mullite | | | | | | | | | | 5 | | | |
| $ZrSiO_4$ | | | | | | | | | | | | 4 | |

COMPOSITE SOLDER GLASSES, THEIR MANUFACTURE AND PROPERTIES: Part II, Manufacturing Process Conditions and Thermal Expansion Coefficients ($10^{-6}$/K)

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Glass Temp., ° C. | 465 | 470 | 470 | 460 | 385 | 395 | 445 | 440 | 470 | 470 | 390 | 380 | 435 |
| Smooth flow Temp., ° C. | 500 | 505 | 505 | 500 | 420 | 480 | 480 | 480 | 490 | 510 | 460 | 420 | 470 |
| $\alpha_{20/200}$ | 4.0 | 4.9 | 5.8 | 6.9 | 5.4 | 4.4 | 8.8 | 8.7 | 6.0 | 4.1 | 4.9 | 6.6 | 8.6 |
| $\alpha_{20/300}$ | 3.9 | 5.0 | 6.0 | 7.1 | 5.5 | 4.5 | 9.2 | 9.2 | 6.2 | 4.0 | 4.9 | 6.5 | 10. |

2. The improvement as defined in claim 1, wherein the filling material is a particulate material having an average grain size of not greater than 15 μm.

3. The improvement as defined in claim 1, wherein the filling material has an average linear thermal expansion coefficient less than $2 \times 10^{-6}$/K in a temperature range between 20 to 300° C.

4. A composite solder glass consisting of a solder glass material and a filling material, wherein said solder glass comprises PbO and $B_2O_3$ and said filling material consists essentially of doped $PbTiO_3$, wherein from 1 to 35 atom % of Pb atoms in said doped $PbTiO_3$ and from 1 to 35 atom % of Ti atoms in said doped $PbTiO_3$ are both replaced with at least one member selected from the group consisting of Ca atoms and Mg atoms and from 0.1 to 15 atom % of O atoms are replaced by fluorine atoms.

5. The improvement as defined in claim 4, wherein up to 60 vol % of said composite solder glass is said filling material.

6. The improvement as defined in claim 4, wherein said solder glass contains PbO and $B_2O_3$ as chief ingredients and is a low melting glass material.

7. The improvement as defined in claim 4, wherein said solder glass contains additional filling material.

8. The improvement as defined in claim 4, wherein said solder glass contains at least one crystallization-required additive ingredient.

9. The improvement as defined in claim 8, wherein said at least one crystallization-required additive ingredient is selected from the group consisting of $ZrO_2$ and $ZrSiO_4$.

10. A method of making a filling material for a composite solder glass, said method comprising the steps of:

a) providing a starting mixture consisting of a reactive powder with an average grain size of from 2 to 12 μm, said reactive power having a composition that is equivalent to that of a material consisting essentially of $PbTiO_3$, at least one oxide selected from the group consisting of MgO and CaO and at least one fluoride selected from the group consisting of $CaF_2$ and $MgF_2$ and in which lead is provided in the form of lead orthoplumbate;

b) compressing the starting mixture prior to sintering;

c) heating the starting mixture at temperatures of from 800 to 1250° C. to sinter the starting mixture to form a sintered reactive powder; and d) cooling the sintered reactive powder to form the filling material;

wherein proportions of said $PbTiO_3$, said at least one oxide and said at least one fluoride for said starting mixture are selected so that said filling material has a composition consisting essentially of said $PbTiO_3$ but in which 1 to 35 atom % of Pb atoms in said $PbTiO_3$ are replaced by at least one member selected from the group consisting of Ca atoms and Mg atoms; 1 to 35% atom % of Ti atoms in said $PbTiO_3$ are replaced by at least one member selected from the group consisting of Ca atoms and Mg atoms; and from 0.1 to 15 atom % of O atoms are replaced by F atoms.

11. A method of making an electronic component or device, said method comprising at least one of hermetically sealing, soldering and coating of individual parts using a composite solder glass made by mixing a solder glass material and a filling material, wherein said filling material is made by a method comprising the steps of:

a) providing a starting mixture consisting of a reactive powder with an average grain size of from 2 to 12 μm, said reactive power having a composition that is equivalent to that of a material consisting essentially of $PbTiO_3$, at least one oxide selected from the group consisting of MgO and CaO and at least one fluoride selected from the group consisting of $CaF_2$ and $MgF_2$ and in which lead is provided in the form of lead orthoplumbate;

b) compressing the starting mixture prior to sintering;

c) heating the starting mixture at temperatures of from 800 to 1250° C. to sinter the starting mixture to form a sintered reactive powder; and d) cooling the sintered reactive powder to form the filling material;

wherein proportions of said PbTiO3, said at least one oxide and said at least one fluoride for said starting mixture are selected so that said filling material has a composition consisting essentially of said $PbTiO_3$, but In which 1 to 35 atom % of Pb atoms in said $PbTiO_3$ are replaced by at least one member selected from the group consisting of Ca atoms and Mg atoms; 1 to 35% atom % of Ti atoms in said $PbTiO_3$ are replaced by at least one member selected from the group consisting of Ca atoms and Mg atoms; and from 0.1 to 15 atom % of O atoms are replaced by F atoms.

12. The method as defined in claim 11, wherein said electronic component or device is a display screen tube or a display device.

13. A method of coating and bonding special glass parts, said method comprising at least one of hermetically sealing, soldering and coating of said glass parts using a composite solder glass made by mixing a solder glass material and filling material, wherein said filling material is made by a method comprising the steps of:

a) providing a starting mixture consisting of a reactive powder with an average grain size of from 2 to 12 μm, said reactive power having a composition that is equivalent to that of a material consisting essentially of $PbTiO_3$, at least one oxide selected from the group consisting of MgO and CaO and at least one fluoride selected from the group consisting of $CaF_2$ and $MgF_2$ and in which lead is provided in the form of lead orthoplumbate;

b) compressing the starting mixture prior to sintering;

c) heating the starting mixture at temperatures of from 800 to 1250° C. to sinter the starting mixture to form a sintered reactive powder; and d) cooling the sintered reactive powder to form the filling material;

wherein proportions of said $PbTiO_3$, said at least one oxide and said at least one fluoride for said starting mixture are selected so that said filling material has a composition consisting essentially of said $PbTiO_3$ but in which 1 to 35 atom % of Pb atoms in said $PbTiO_3$ are replaced by at least one member selected from the group consisting of Ca atoms and Mg atoms; 1 to 35% atom % of Ti atoms in said $PbTiO_3$ are replaced by at least one member selected from the group consisting of Ca atoms and Mg atoms; and from 0.1 to 15 atom % of O atoms are replaced by F atoms.

* * * * *